United States Patent Office 3,672,848
Patented June 27, 1972

3,672,848
PROCESSING OF IRRADIATED NUCLEAR FUELS
Alfred Leonard Mills and Robert William Jackson Vivers, Thurso, Scotland, assignors to United Kingdom Atomic Energy Authority, London, England
No Drawing. Filed Dec. 31, 1969, Ser. No. 889,728
Int. Cl. C01g 43/00, 57/00
U.S. Cl. 23—342   1 Claim

ABSTRACT OF THE DISCLOSURE

A method in which irradiated monocarbide nuclear fuel is dissolved in nitric acid and the solution is subjected to the oxidising effect of ozone or electrolytic oxidation to effect oxidation of organic compounds in the solution. Oxidation is terminated at the onset of the conversion of plutonium in the solution to the hexavalent state.

---

The present invention relates to the processing of irradiated nuclear fuels. More specifically it is concerned with the dissolution in nitric acid of an irradiated monocarbide fuel containing not only uranium but also significant plutonium, for example, single phase solid solution monocarbides such as uranium plutonium monocarbide (UPu)C.

BACKGROUND OF THE INVENTION

The dissolution of such fuel in nitric acid is a preliminary stage in the separation of the uranium and plutonium from fission products by solvent extraction techniques. One of the problems however of direct dissolution is that complex organic compounds are produced by the action of nitric acid on the fuel in question and these compounds give rise to difficulties in the solvent extraction process because they interfere with solvent/aqueous phase disengagement and complex the plutonium present in solution. They can also be a hazard in the raffinates by being a source of "fume-off" reactions or even explosions in fuel storage tanks if the cooling were to fail. The recognition of this phenomena goes back at least as far as 1957. Much attention has been given more recently to a two-stage preparation which relies on aqueous hydrolysis to produce a residue which is then readily soluble in the nitric acid. Not only is a two-stage preparation unattractive in itself but in relation to the hydrolysis treatment it has been found that after irradiation the fuel in question acquires an inertness to water at 100° C. and that the reaction therefore has to be carried out at high temperatures using steam.

SUMMARY OF THE INVENTION

According to the present invention a method of treating irradiated monocarbide nuclear fuel comprises dissolving the irradiated monocarbide in nitric acid and subjecting the solution so formed to the oxidising effect of ozone or electrolytic oxidation to effect oxidation of organic compounds in the solution without oxidising the plutonium in the solution to the hexavalent state.

The invention is based on the discovery that the oxidising effect of ozone or electrolysis is exerted on the organic compounds before it is exerted on the plutonium. The organic compounds may therefore be destroyed by the oxidising effect without also oxidising the plutonium. A characteristic red/brown coloration is imparted to the nitric acid solution by the organic compounds and removal of this coloration indicates completion of the oxidation of the organic compounds. Oxidation of the plutonium will however follow oxidation of the organic compounds if oxidation is allowed to continue. It is accordingly desirable to stop oxidation on disappearance of the coloration since the plutonium is preferred in the tetravalent state for subsequent solvent extraction. As it is not always practicable on a plant scale to detect disappearance of the coloration the onset of plutonium oxidation may be detected as an alternative. To this end redox potential or spectrophotometric measurements may be made on the solution.

DESCRIPTION OF THE PREFERRED EMBODIMENTS

The invention is illustrated by the following examples:

EXAMPLE 1

A standard H type electrochemical cell was used with a PORVIC-M membrane separating the anode and cathode compartments. The electrolyte was 6 N nitric acid. 50 gm. irradiated fuel which was (UPu)C steel in its stainless steel can but chopped into suitable lengths with ends exposed was placed in the anode compartment. The cell was heated at 100° C. and a current of 1 amp. at 4 volts was passed through the cell for six hours. During this time spectrophotometric measurements were carried out to check the plutonium valency. It was found that after 6 hours the oxidation of organic compounds was complete and that this coincided with the start of plutonium oxidation. The resulting liquid was removed from the cell and tested by solvent extraction with 20% by volume tributyl phosphate for the extraction and backwashing of plutonium. The plutonium behaviour was satisfactory and the solvent aqueous phase disengagement was also satisfactory.

EXAMPLE 2

A similar quantity of irradiated fuel (UPu)C was placed in 6 N nitric acid and refluxed for twelve hours with a stream of ozonised oxygen being passed through the liquid (7% by volume ozone, rate of oxygen addition 12 litres/hr.). Spectrophotometric measurements were carried out as in Example 1 and it was again found that the completion of oxidation of the organic compounds coincided with the onset of plutonium oxidation. The final uranium/plutonium concentration was 200 gms./litre and the nitric acid concentration 3 N. This liquid was tested by solvent extraction as above and was found to be satisfactory.

It is notable that the method requires only a moderate acid strength, 6 N being a typical value for the initial dissolution of the monocarbide.

The invention may be applied to the oxidation of mixed monocarbides and to single phase solid solutions. Further, up to 30% sesquicarbide may be present in the nuclear fuel with the monocarbide.

We claim:
1. A method of treating irradiated nuclear fuel comprising uranium/plutonium monocarbide, which method comprises dissolving the irradiated monocarbide in nitric acid and subjecting the solution so formed to the oxidizing effect of ozone or electrolytic oxidation to effect oxidation of organic compounds in the solution without oxidizing the plutonium in the solution to the hexavalent state.

References Cited
UNITED STATES PATENTS 2,830,939   4/1958   Wahl _____ 204—1.5
2,916,349   12/1959  Crandall et al. _____ 2.3—339

REUBEN EPSTEIN, Primary Examiner

U.S. Cl. X.R.
204—1.5